United States Patent [19] [11] 4,333,191
Long [45] Jun. 8, 1982

[54] COMBINATION MOTOR HOME AND HOUSE BOAT

[76] Inventor: Alvin L. Long, Civilian Gen. Del., Beale A.F.B., Calif. 95903

[21] Appl. No.: 917,952

[22] Filed: Jun. 22, 1978

[51] Int. Cl.³ ............... B60P 3/10; B63B 21/64; B63C 13/001
[52] U.S. Cl. .................... 114/344; 296/164; 114/61; 114/71; 114/56; 114/270
[58] Field of Search ............... 9/1.2, 2 R, 2 C, 2 F, 9/2 S; 114/290, 123, 270; 115/1 R, 1 A, 1 C; 296/164, 167, 168

[56] References Cited

U.S. PATENT DOCUMENTS

| 2,310,431 | 2/1943 | Hart | 9/1.2 |
| 3,091,208 | 5/1963 | Copeland | 9/1.2 |
| 3,154,044 | 10/1964 | Bellas | 115/1 R |
| 3,486,786 | 12/1969 | Howarth | 9/1.2 |
| 3,762,759 | 10/1973 | Hall | 296/164 |
| 3,817,545 | 6/1974 | Ward | 296/164 |
| 3,940,813 | 3/1976 | Konstantinov | 114/290 |
| 3,981,259 | 9/1976 | Harper | 114/123 |
| 4,101,162 | 7/1978 | Koehn | 296/164 |

Primary Examiner—Trygve M. Blix
Assistant Examiner—D. W. Keen

[57] ABSTRACT

Disclosed herein is a combination motor home and houseboat in one mobile unit, said unit including a lower portion that is a partial motor home, and an invertable upper unit that is a complete houseboat. The float portion of the houseboat forms the entire roof of the combination motor home and houseboat when they are together as one unit, and provides a walkway around the house in the waterborne configuration of the houseboat. When the two units are together they form a full size motor home with access to each other by connecting doorways. When the upper unit is to be used as a houseboat, hydraulic rams on the motor home portion are used to invert the houseboat portion and place it into the water.

1 Claim, 6 Drawing Figures

COMBINATION MOTOR HOME AND HOUSE BOAT

BACKGROUND OF THE INVENTION

The present invention relates to motor homes and houseboats. In the past, those who owned houseboats were restricted to leaving them in one place due to problems of transportation. In addition, those with motor homes sometimes placed them on barges, and subsequently used the resulting assembly in the manner of a houseboat. Such a concept is impractical, because barges that will accommodate motor homes are not generally available at the desired locations.

SUMMARY OF THE INVENTION

The present invention provides a combination motor home and houseboat and is believed to have solved the problems of both houseboaters who are restricted to one location and motor home owners who would like to be occasional houseboaters. The present invention may serve as a full-size motor home or a full-size houseboat and a smaller separate motor home. The houseboat portion, which is normally carried on the motor home, comprises a portion of the motor home when they are together. After the motor home operator has launched said portion to be used as a houseboat, which may be done at any boat ramp, the remainder of the motor home may still be used as a shelter, although it is considerably smaller with the houseboat portion removed.

OBJECT OF THE INVENTION

The object of the present invention is to provide a single mobile unit that may serve as a full-size motor home, or, upon utilization of means provided, as a full-size houseboat, and a smaller, separate motor home, such a unit also providing a considerable cost and enjoyment advantage over multiple units providing like or similar functions.

IN THE DRAWINGS

DETAILED DESCRIPTION

Figure 1:
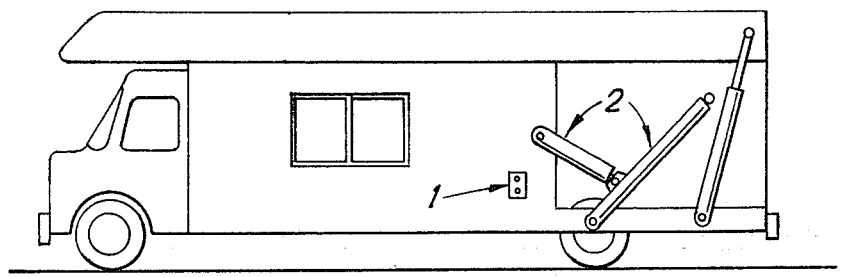
FIG. 1 is a side view of a combination motor home-houseboat.
Figure 2:
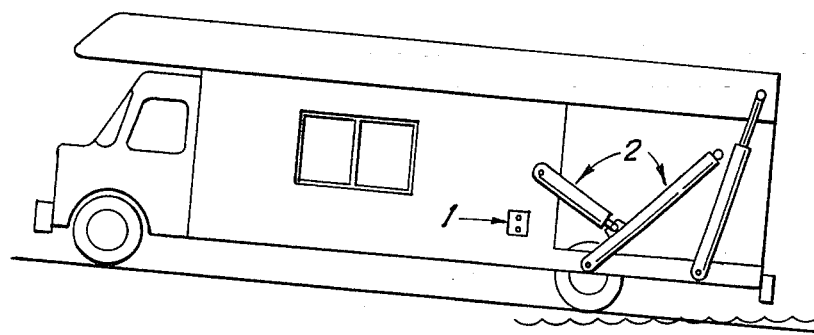
FIG. 2 is a side view of a combination motor home-houseboat unit on a boat launching ramp.
Figure 3:
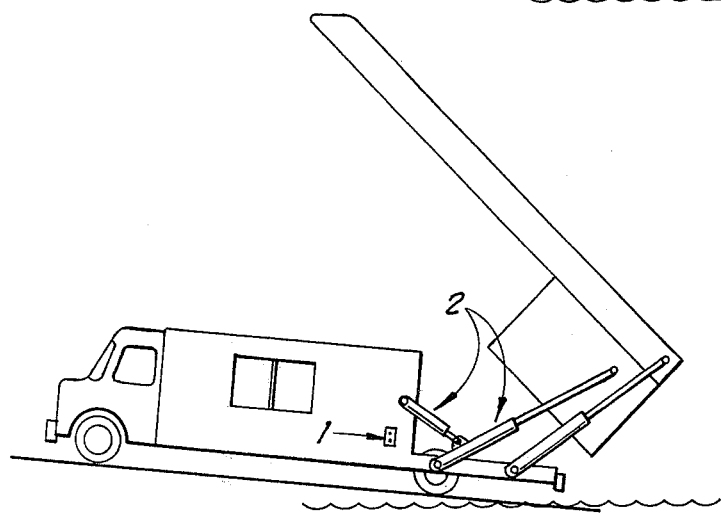
FIG. 3 shows the motor home unloading the houseboat by use of hydraulic means (rams) which raise and invert the houseboat rearwardly.
Figure 4:
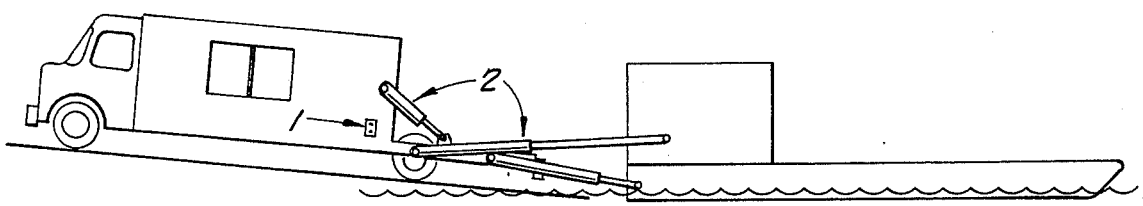
FIG. 4 shows the houseboat portion of the unit floating and ready to be disconnected from the motor home.
Figure 5:
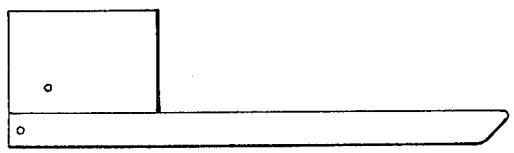
FIG. 5 shows the houseboat disconnected from the motor home.
Figure 6:
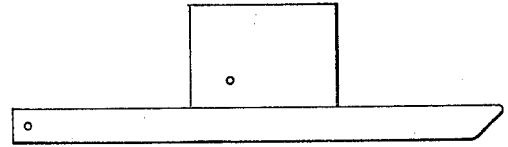
FIG. 6 shows the house or cabin on the houseboat moved to a central position on the float means.

In the drawings, FIG. 1, is shown a combination motor home-houseboat according to the invention. The houseboat portion (top, including floats, and rear) is carried on the motor home in an inverted position. Doorways (not shown) between the motor home front portion including the vehicle cab and a shelter of similar shape and the houseboat portion line up with each other thus making them as one unit when together. The houseboat portion can be unloaded on any flat surface by hydraulic rams (2) mounted between the houseboat and motor home which lift the houseboat 2-3 and invert it, responsive to an operator at control panel (1). In FIG. 2, the motor home has backed down a boat ramp and is ready to unload its house boat portion. FIG. 3 shows the motor home unloading its houseboat. Hydraulic rams (2) are turning the houseboat over as they lower it into water. Controls (1) are located at side of the motor home. In FIG. 4 the house boat is floating in the water ready for said hydraulic rams to be disconnected. In FIG. 5 the houseboat is floating free of the motor home. In FIG. 6 the house on the houseboat, being mounted on tracks (not shown), has been moved to a central position on the houseboat, for better boat balance.

To unload the houseboat portion, hydraulic system controls on panel (1) are operated so as to actuate hydraulic cylinders or rams (2), said rams being pivotally attached to both vehicle portions and being so dimensioned and positioned that the houseboat is raised and rotated about its stern from an inverted position atop the vehicle to a position in the water to the rear of the vehicle in a right-side-up or use position, the cabin or house of the houseboat portion being then moved to a central position on the attached float means, and the rams being disconnected from said houseboat portion. Retrieval of the houseboat portion is accomplished by reversal of the above procedure.

What is claimed is:

1. The motor home-houseboat combination vehicle comprising a road-going vehicle having at least four wheels in standard configuration, an enclosed cab, the space behind said cab being occupied by a shelter of substantially the same transverse cross-sectional configuration as said cab and an inverted houseboat cabin having a cross section such that its sides and top are continuations of the like surfaces of said shelter, said houseboat cabin being positioned in tandem with and behind said shelter and lying atop a planar platform extension of the said shelter which extends to the end of the frame of said truck; and buoyant float means attached to the bottom of said inverted houseboat cabin, which extend substantially the length of the vehicle, and further including detachable hydraulic ram means attached to said cabin and said platform on each side of the vehicle which, when actuated, are capable of lifting and rotating said cabin and attached to pontoons from a first inverted position aboard said truck to a right-side-up position in line with and to the rear of said truck for launching thereof, and subsequent retrieval, the craft being returnable to its initial position by said ram means, the cabin being longitudinally moveable atop the float means when said right-side-up position.

* * * * *